UNITED STATES PATENT OFFICE.

GRAY STAUNTON, OF MUSKEGON, MICHIGAN.

PROCESS OF DEVULCANIZING RUBBER.

1,169,437.　　　Specification of Letters Patent.　　Patented Jan. 25, 1916.

No Drawing.　　Application filed June 13, 1914.　Serial No. 844,903.

*To all whom it may concern:*

Be it known that I, GRAY STAUNTON, a citizen of the United States, residing at Muskegon, in the county of Muskegon and State of Michigan, have invented certain new and useful Improvements in Processes of Devulcanizing Rubber, of which the following is a specification.

The object of my invention is to provide a new and useful process whereby to industrially utilize the india rubber that may be incorporated in rubber waste, such as discarded vehicle tires, water hose, and the like, in which rubber is present in sufficient quantities to render the practice of the process commercially efficient, by devulcanizing the rubber by eliminating or absorbing practically all of the sulfur so that the compound may again be employed in a similar manner as in the use of new fresh stock.

The india rubber recovered by my process differs but little in character, from the original stock, as regards its mastic, elastic and tenacious qualities and can again be readily vulcanized, just as it was originally vulcanized. It is soft and gummy so that it can be worked alone without the necessity of adding new stock to the compound and without formation of lumps and blisters when being milled.

My present invention differs radically from processes wherein the ground rubber waste, or scrap, is submerged in a solution and the solution submitted to the action of steam or other fluids in closed vessels, or digesters, under pressure generally from two to three hundred pounds per square inch for periods of time ranging from 12 to 36 hours.

In the practice of such old processes the long continued temperature produces a change in the chemical constitution of some of the fillers of the rubber compound and a softening and weakening of the rubber itself. It has also been heretofore suggested that the comminuted rubber waste be pressed into blocks in a mold, and while under pressure submitted to a relatively high temperature. I have found such processes to be inoperative for the reason that the temperature necessary to have any devulcanizing effect whatever upon the material contained within the region of the center of the compressed block is of such high degree as to burn and destroy those portions of the material that are nearer the surfaces of the compressed cake.

In carrying my present invention into effect I first grind up the rubber shoddy, or waste to be reclaimed, into as fine conglomerate as practicable in the ordinary rubber mill until it has been reduced to a highly comminuted, loose, fluffy mass. I then clean it of mechanically associated fiber. After the rubber waste has been ground and cleaned in the manner described, it is thoroughly intermixed with carbonate of potassium ($K_2Co_3$), or other sulfur absorbent which is in a pulverulent state, in the proportion of about eighty (80) per cent. rubber waste and twenty (20) per cent. of the absorbent, by weight, and he mixed, substantially dry material is then spread out in trays, in rather thin layers, so that the heat to which it is to be subsequently subjected can have an even or uniform action upon all of the material. The material or mixture in the trays is then, while in this dry, loose condition, inclosed in a pressure tight chamber and steam is admitted to the chamber and the contents is subjected to a pressure of from 15 to 60 pounds, per square inch, varying in accordance with the character of the material being treated. The steam pressure may be made to go higher than 60 pounds and get results, but I have found from practice that the pressure below 60 pounds gives the best results.

Sulfur absorbents, such as the salts alkali metals, especially carbonate of potassium is a dry powder, in its normal condition, containing only about 2 per cent. moisture, but is of a deliquescent nature, and when I speak of dry material I mean that the mixture contains no more moisture than that absorbed by its deliquescent action. After the mixture, in its loose, finely divided state, is subjected to the steam heat, as above described, it is left in the heated receptacle for, preferably, four hours. I have found from experiment that two hours will give useful results and furthermore that it may be left somewhat longer than four hours without materially injuring the quality of the mixture, but my experience leads me to believe that four hours is sufficient to produce the most beneficial results. At the expiration of the four hour period the material is taken out of the receptacle.

When the mixture is subjected to the heat, as above described, when carbonate of potash is used, it absorbs the sulfur given off by the pulverized waste or shoddy, thereby forming substantially pentasulfid of potassium ($K_2S_5$). This is soluble in water. Other salts, well known in the art, may be used in lieu of carbonate of potassium, the combination of which with sulfur produces a soluble chemical resultant. The mixture is now washed to eradicate this resultant chemical compound. After washing the product it can go directly on a rubber mill and be dried and sheeted. It will then be ready to be worked without being mixed with fresh rubber, or it may be further compounded with fresh rubber for a higher class of goods. It can be dried and mixed directly with fresh rubber stock without the labor of sheeting, for this process of devulcanizing is of such a character that the reclaimed compound, even in its powdery form, assimilates with the usual new rubber stock.

Having described my invention, what I claim is:—

1. The process of devulcanizing rubber contained in rubber waste, which consists in grinding the waste; mixing it, while dry, with a substantially dry salt of an alkaline metal, in a powdery form; spreading out the loose, dry, powdery mixture in relatively thin layers, and subjecting the mixture, while in the dry, loose, powdery condition, to the direct action of steam, under 60 pound pressure, or less.

2. The process of devulcanizing rubber contained in rubber waste, which consists in grinding the waste; mixing it, while dry, with substantially dry carbonate of potassium, in a powdery form; spreading out the loose, dry powdery mixture in relatively thin layers, and subjecting the mixture, while in the dry, loose, powdery condition, to the direct action of steam, under 60 pound pressure, or less.

In testimony whereof I hereunto set my hand in the presence of two subscribing witnesses.

GRAY STAUNTON.

In the presence of—
NORMAN T. THOMSON,
JOHN W. WILSON.